United States Patent [19]
Mori et al.

[11] Patent Number: 5,309,273
[45] Date of Patent: May 3, 1994

[54] YAG LASER MASK MARKER

[75] Inventors: Akira Mori, Chigasaki; Yukihiro Tsuda, Hatano, both of Japan

[73] Assignee: Kabushiki Kaisha Komatsu Seisakusho, Tokyo, Japan

[21] Appl. No.: 926,780

[22] Filed: Aug. 6, 1992

[30] Foreign Application Priority Data

Aug. 9, 1991 [JP] Japan ................................. 3-224916

[51] Int. Cl.$^5$ ...................... G02B 26/08; B23K 26/00
[52] U.S. Cl. ................... 359/202; 359/201; 372/10; 219/121.68; 345/55
[58] Field of Search ............... 359/201-202, 359/212, 43, 45, 54, 55, 57, 36; 340/713-714; 372/10, 30-31, 15; 219/121.68, 121.73-121.75, 121.78-121.82

[56] References Cited

U.S. PATENT DOCUMENTS 4,952,034  8/1990  Azusawa et al. ................... 359/202
5,157,235  10/1992  Okumura et al. ............. 219/121.68

FOREIGN PATENT DOCUMENTS 2-15887  1/1990  Japan .
2-187287  7/1990  Japan .
2-268988  11/1990  Japan .

*Primary Examiner*—Loha Ben
*Assistant Examiner*—James Phan
*Attorney, Agent, or Firm*—Richards, Medlock & Andrews

[57] ABSTRACT

A YAG laser mask marker includes a YAG laser oscillator (1), a first deflector (3X, 3Y) for deflecting a laser beam from the YAG laser oscillator in X and Y directions, a liquid crystal mask (6) for displaying a predetermined pattern to be raster scanned by the laser beam from the first deflector, a second deflector (7X, 7Y) for deflecting in X and Y directions the raster scanned light which has passed through the liquid crystal mask, a work (10) on which the raster scanned light from the second deflector is illuminated to print the pattern on an surface thereof, and a controller (11). The controller stores an entire pattern as dot data, divides the stored entire pattern data into a plurality of block-shaped divided pattern data items, and performs printing on the work by lowering an intensity of laser beam by the Q switch, by selecting one divided pattern data item from the plurality of divided pattern data items together with the address data thereof, by displaying the divided pattern data item on the liquid crystal mask as a divided pattern portion, by moving the first deflector to a raster starting position, by moving the second deflector to a printing area on the work on the basis of the address data, and by pulse oscillating the YAG laser oscillator by the Q switch and thereby raster scanning the divided pattern portion displayed on the liquid crystal mask by the first deflector.

44 Claims, 5 Drawing Sheets

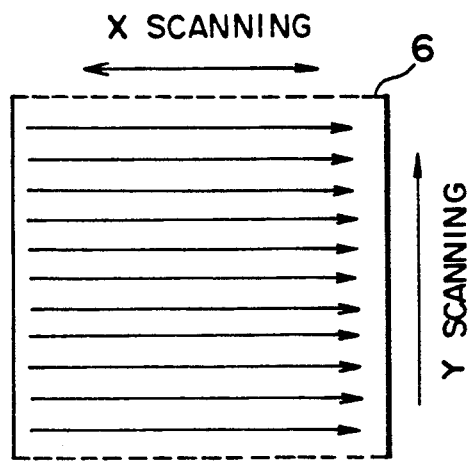
F I G. 2
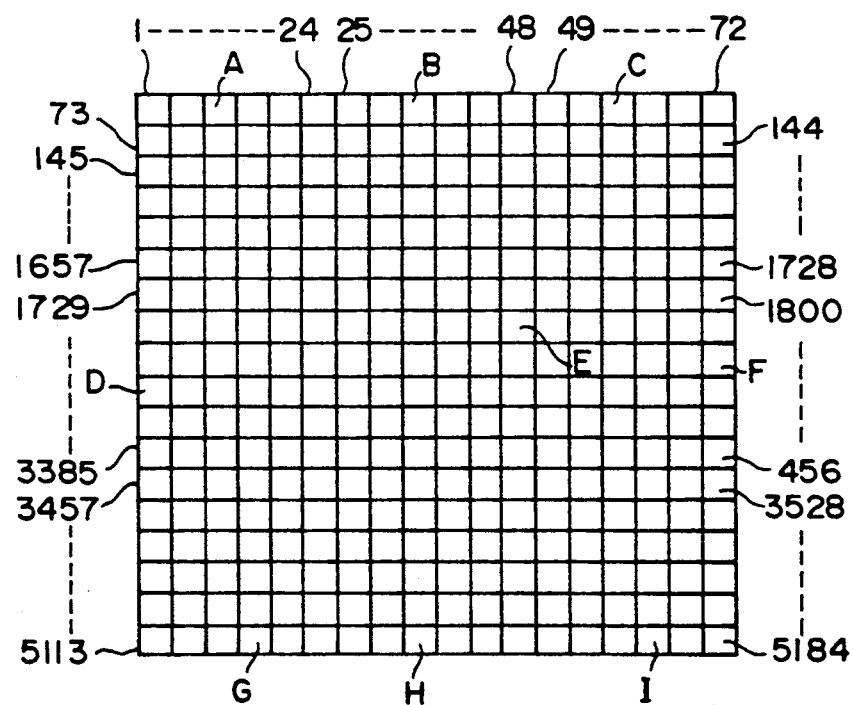
F I G. 3

YAG LASER MASK MARKER

TECHNICAL FIELD OF THE INVENTION

The present invention relates to a laser mask marker which can adequately and instantaneously change a pattern, including complicated and desired characters, symbols, figures and patterns, on a work made of a metal, resin, ceramic, paper or cloth, and which can perform clear, high speed printing over a large area without moving the work during printing and without generating variations using a small laser oscillator.

BACKGROUND ART

One example of a conventional laser mask marker of the above described type includes a fixed mask having a plurality of different fixed patterns on a surface thereof, a XY deflector disposed on the laser beam incident side of the fixed mask for illuminating a laser beam to a desired fixed pattern, and a XY deflector disposed on the laser beam emerging side of the fixed mask for illuminating the laser beam which has passed through the desired pattern to a desired position on a work, and performs synthetic printing of adequately combined fixed patterns on a large area of the work without shifting the work (see Japanese Patent Laid Open No. 2-15887).

In another example of such a conventional laser mask marker, an entire pattern is divided into a plurality of divided pattern portions, the divided pattern portions are displayed on a liquid crystal mask on a time division basis, and synthetic printing is performed on a work by shifting the work in one direction each time a laser beam is illuminated on the liquid crystal mask (see Japanese Patent Laid Open No. 2-187287).

Other laser mask markers are disclosed in, for example, Japanese Patent Laid Open No. 2-268988).

In recent years, there has been a demand for a YAG laser mask marker which can adequately and instantaneously change a pattern, including complicated and desired characters, symbols, figures and patterns, on a work made of a metal, resin, ceramic, paper or cloth, and which can perform clear, high speed printing over a large area without moving the work during printing and without generating variations using a small laser oscillator.

The aforementioned conventional laser mask markers cannot meet such a demand due to the following drawbacks.

In the laser mask marker disclosed in Japanese Patent Laid Open No. 2-15887, when a pattern other than the plurality of fixed patterns on the fixed mask is to be printed, the fixed mask must be replaced with another one. Also, the XY deflector disposed on the laser beam incident side is considered to be used only for selective illumination of the fixed pattern and not for raster scanning. That is, the illumination of the laser beam conducted by the XY deflector is considered batch illumination of the fixed pattern with an enlarged laser beam. Thus, although this structure is advantageous in that synthetic printing can be conducted on a large area without shifting the work during printing, a complicated and desired pattern cannot be suitably and instantaneously changed, as clear, high speed printing which is free from variations cannot be conducted using a small laser oscillator.

The laser mask marker disclosed in Japanese Patent Laid Open No. 2-187287 is an epoch making marker in terms of the display of the entire pattern on the liquid crystal mask on a time division basis. In this laser mask marker, a complicated pattern can be suitably and instantaneously changed, and synthetic printing can be performed on a large area. However, since the work is synchronously moved each time the laser beam is illuminated, clear, high speed printing free from variations cannot be performed without moving the work during printing using a small laser oscillator. The laser mask marker disclosed in Japanese Patent Laid Open No. 2-268988 suffers from the same problem.

SUMMARY OF THE INVENTION

In view of the aforementioned problems of the conventional techniques, an object of the present invention is to provide a laser mask marker which can adequately and instantaneously change a pattern made up of complicated and desired characters, symbols, figures and patterns on various types of work, and which can perform clear, high speed printing over a large area without moving the work during printing and without generating variations using a small laser oscillator.

According to a first aspect of the present invention, there is provided a YAG laser mask marker which includes a YAG laser oscillator, a first deflector for deflecting in X and Y directions a laser beam from the YAG laser oscillator, a liquid crystal mask for displaying a predetermined pattern to be raster scanned by the laser beam from the first deflector, a second deflector for deflecting in X and Y directions the raster scanned light which has passed through the liquid crystal mask, a work on which the raster scanned light from the second deflector is illuminated to print the pattern on an illumination surface thereof, and a controller. The YAG laser oscillator is provided with a Q switch. The controller (1) stores an entire pattern, to be printed on the work, as dot data with each dot being represented by either 0 or 1, and divides the stored entire pattern data into a plurality of block-shaped divided pattern data items, and (2) performs printing on the work (a) by lowering an intensity of the laser beam by the Q switch, (b) by selecting one divided pattern data item from the plurality of divided pattern data items together with the address data thereof, (c) by displaying the divided pattern data item on the liquid crystal mask as a divided pattern portion, (d) by driving the first deflector to a raster starting position and stopping the first deflector at that position, (e) by driving the second deflector on the basis of the address data of the divided pattern data item such that the second deflector is directed toward a printing area on the work and stopping the second deflector there, and then (f) by pulse oscillating the YAG laser oscillator by the Q switch and thereby raster scanning the divided pattern portion displayed on the liquid crystal mask by the first deflector. The process of the step (a) through step (f) is sequentially performed on the other subsequent divided pattern data items until the entire pattern is synthesis printed on the work.

According to a second aspect of the present invention, the step (d) is conducted prior to the step (a), between the steps (a) and (b), between the steps (b) and (c) or between the steps (e) and (f).

The controller of the YAG laser mask marker according to the first and second aspects of the present invention can additionally perform at least one of the following control operations.

According to a third aspect of the present invention, when none of the dots of the selected divided pattern data item has any printing data representing marking to be accomplished, the controller sends an instruction to omit the display of that divided pattern portion on the liquid crystal mask, and selects a subsequent divided pattern data item.

According to a fourth aspect of the present invention, when none of the dots of at least one line corresponding to the uppermost, lowermost, rightmost or leftmost side of the selected divided pattern data item has any printing data representing marking to be accomplished, the controller sends to the first deflector an instruction of omitting raster scanning on the at least one line in which the dot data has no printing data indicating marking to be accomplished.

According to a fifth aspect of the present invention, when none of the dots of at least one line corresponding to the uppermost, lowermost, rightmost or leftmost side of the extracted divided pattern data item has any printing data representing marking to be accomplished, the controller uses the Q switch to lower the intensity of the laser beam oscillated during raster scanning to the at least one line in which the dot data has no printing data representing marking to be accomplished.

According to a sixth aspect of the present invention, the controller divides the entire pattern data into a plurality of block-shaped divided pattern data items such that the dot data corresponding to the adjoining sides of the adjoining divided pattern data items are overlapped on top of one another by at least one line.

According to a seventh aspect of the present invention, the controller simultaneously displays all of the pattern data on the liquid crystal mask, i.e. the entire pattern data without division thereof.

According to an eighth aspect of the present invention, the controller lowers the intensity of laser beam by the Q switch while a line feed is conducted during raster scanning.

According to a ninth aspect of the present invention, the second deflector includes a galvanometer scanner disposed close to the liquid crystal mask for deflecting the laser beam in an X direction, a Y direction deflecting lens disposed close to the work for deflecting the laser beam in a Y direction, and an objective lens disposed between the galvanometer scanner and the Y direction deflecting lens. The Y direction deflecting lens is provided on a mechanism for moving the lens parallel to a printing surface of the work.

The operation of the present invention will now be described.

The YAG laser oscillator according to the first aspect of the present invention oscillates a laser beam having wavelengths which are less absorbed by the liquid crystal mask, lens and mirror (hereinafter, these are referred to as a glass system) and which ensure that the heat load to the glass system is reduced. Furthermore, the YAG laser oscillator pulse oscillates a laser beam having a peak value suitable for deep marking (herein, marking is also called printing).

The first deflector deflects the laser beam in the XY directions and thereby raster scans the divided pattern portion displayed on the liquid crystal mask. As shown in FIG. 2, raster scanning consists of the steps of scanning the laser beam on the liquid crystal mask 6 from the left upper end to the right end by the X direction deflector, line feeding the laser beam to the left end of a subsequent line by the Y direction deflector, scanning the laser beam from the left end to the right end again by the x direction deflector, and repeating the aforementioned process until the final X line is scanned. Unlike the conventional technique of batch illuminating an enlarged laser beam, this raster scanning uses pinpoint illumination by the laser beam. Thus, the laser beam can be illuminated on the liquid crystal mask at a uniform and high intensity. The liquid crystal mask changes over the displayed pattern adequately and instantaneously.

The second deflector deflects the laser beam which has passed through the liquid crystal mask in XY directions. This second deflector remains at rest in a state wherein it is directed toward the area on the work on which the divided pattern portion is to be printed during raster scanning. When the divided pattern portion is changed, the second deflector is driven such that it is directed toward the area on the work on which a subsequent raster scanning divided pattern portion is to be printed. The work stays at a fixed position until synthetic printing of the entire pattern is completed.

Each of the Q switch of the YAG laser oscillator, the first deflector, the liquid crystal mask, and the second deflector are driven by an easily handled electric signal. The drive of each of these components is controlled by the controller.

The controller inputs and stores the entire pattern, to be printed on the work, in the form of dot data wherein each dot is represented by either 0 or 1, and divides the stored entire pattern data into a plurality of block-like divided pattern data items. That is, as shown in FIG. 3, the controller inputs and stores the entire pattern at an address consisting of 72×72 dots in, for example, a main memory as dot data wherein a 1 represents a printing portion and a 0 represents a nonprinting portion. The controller divides the stored entire pattern data into nine address groups (i.e., divided pattern data items) A through I, each consisting of 24×24 dots. The entire pattern data and the divided pattern data items are each made up of the pattern data and the predetermined address data. The controller performs the following control operations on the Q switch of the YAG laser oscillator, the first deflector, the liquid crystal mask, and the second deflector during printing on the basis of the pattern data and the address data to synthesize the entire pattern on the work.

The controller lowers the oscillation intensity of the laser beam by the Q switch (step a). The laser beam illuminated on the liquid crystal mask before the first divided pattern portion is displayed or when display of the divided pattern portion is changed (including the drive and stoppage of the second deflector, hereinafter a change of the display including the drive and stoppage of the second deflector, unless otherwise specified) is not associated with printing on the work. Rather, the laser beam illuminated at those times may be distorted and reflected and may increase the heat load to the glass system. Hence, the controller lowers the oscillation intensity of the laser beam during those times by use of the Q switch.

Next, the controller selects or extracts a single divided pattern data item from the plurality of divided pattern data items, together with the address data thereof (step b). When, for example, the divided pattern data item A is to be extracted in FIG. 3, data from address 1 to address 24 is temporarily inputted to the memory, and then data from address 73 to address 96 is inputted. Thereafter, inputting of data continues until data from address 1657 and address 1680 is inputted, whereby selection or extraction of the divided pattern data item A is completed. The individual divided pattern data items A through I are extracted in the order which ensures that raster printing is conducted from the left to the right of the complete entire pattern with the upper left divided pattern portion thereof being extracted first. However, the extraction order may be changed, with the shape of the work, the contents of the entire pattern or the printing rate taken into consideration.

Next, the controller displays the extracted divided pattern data item on the liquid crystal mask as the divided pattern portion (step c).

Next, the controller drives the first deflector to the raster starting position and then stops the first deflector (step d).

Next, the controller drives the second deflector toward the printing area of the divided pattern portion on the work on the basis of the address data of the extracted divided pattern data item (step e), and stops the second deflector.

Finally, the controller pulse oscillates the YAG laser oscillator by the Q switch and thereby raster scans the pattern portion displayed on the liquid crystal mask by the first deflector (step f).

A divided pattern portion is printed on the work by conducting the aforementioned step a through step f. When the synthetic printing of the entire pattern is not completed, the aforementioned step a through step f is repeatedly conducted on subsequent other divided pattern data items until the entire pattern is synthesized on the work.

According to the second aspect of the present invention, the step d is conducted at any time before raster scanning is initiated.

According to the third to ninth aspects of the present invention, typical optional structures of the YAG laser mask marker according to the first and second aspects are provided.

That is, when the entire pattern data is divided, an divided pattern data item in which none of the dots has any printing data may be generated. The third aspect of the present invention copes with such a case. If a 1 represents the dot data which has printing data representing marking to be accomplished, a 0 represents the dot data which has no printing data representing marking to be accomplished. In the above mentioned case, all of the dot data of the divided pattern data item has a 0. Display of such a divided pattern data item on the liquid crystal mask generates scattering of all the laser beam incident on the liquid crystal mask, increases the heat load to the glass system, prevents high speed printing of the entire pattern, and generates drive loss of the deflector. Hence, according to the third aspect of the present invention, when the controller according to the first and second aspects extracts the divided pattern data item in which none of the dots has any printing data, display of the divided pattern data items on the liquid crystal mask is omitted until a divided pattern data item in which dot data has printing data is extracted. When the divided pattern data item in which even a single dot has printing data is extracted again, the divided pattern portion based on that divided pattern data item is displayed on the liquid crystal mask.

If the divided pattern portion in which none of the dots has any printing data is not displayed on the liquid crystal mask, the second deflector is not activated, because the address data of that divided pattern data item is omitted. Thus, the generation of the aforementioned problems is avoided. Any divided pattern portion in which the dot data has printing data is stored together with the address data thereof. Thus, omission of the display of the divided pattern portion in which none of the dots has any printing data does not affect synthetic printing of the entire pattern.

According to the fourth aspect of the present invention, an improved laser mask marker according to the third aspect is provided. That is, in each divided pattern portion, dot data having no printing data exits at random. Hence, when none of the dots on at least one line corresponding to the uppermost, lowermost, rightmost or leftmost side on the liquid crystal mask has any printing data, the controller sends an instruction to the first deflector to omit raster scanning conducted on that at least one line.

According to the fifth aspect of the present invention, a substitute for the laser mask marker according to the fourth aspect is provided. The controller executes raster scanning by the first deflector on at least one line corresponding to the uppermost, lowermost, leftmost or rightmost side in which no printing data exists but lowers the intensity of the laser beam oscillated on that at least one line by the Q switch.

In a completed entire pattern, a printing gap which looks like a line may be present between the adjoining printing sides of the adjoining divided pattern portions due to backlash of the second deflector, displacement of the optical system element or variations in the control signal caused by external noises. According to the sixth aspect of the present invention, such a printing gap is eliminated. That is, the controller divides the entire pattern data into a plurality of block-shaped divided pattern data items such that the dot data corresponding to the adjoining sides of the adjoining divided pattern data items are overlapped on top of one another by at least one line.

According to the seventh aspect of the present invention, when a fine and simple entire pattern is printed on a fine area on the work, the controller sends an instruction to the liquid crystal mask to display the entire pattern without dividing it, and sends an instruction to the second deflector to face the printing position of the entire pattern.

Like the laser beam oscillated before the first divided pattern portion is displayed on the liquid crystal mask and when the displayed pattern is replaced, the laser beam oscillated during the line feeding in the raster scanning is not associated with printing of the work. Rather, such a laser beam may be distorted or reflected or may increase a heat load to the glass system. Hence, the controller uses the Q switch to lower the oscillation intensity of the laser beam during line feed in the raster scanning.

According to the ninth aspect of the present invention, a new second deflector suitable for use in the YAG laser mask marker according to the present invention is provided.

BRIEF DESCRIPTION OF THE DRAWINGS

FIG. 2 illustrates the raster scanning conducted in the present invention;

FIG. 3 illustrates how entire pattern data is stored in a main memory of a controller in the present invention;

BEST MODE FOR CARRYING OUT THE INVENTION

Preferred embodiments of a YAG laser mask marker according to the present invention will be described below with reference to the accompanying drawings.

Figure 1:
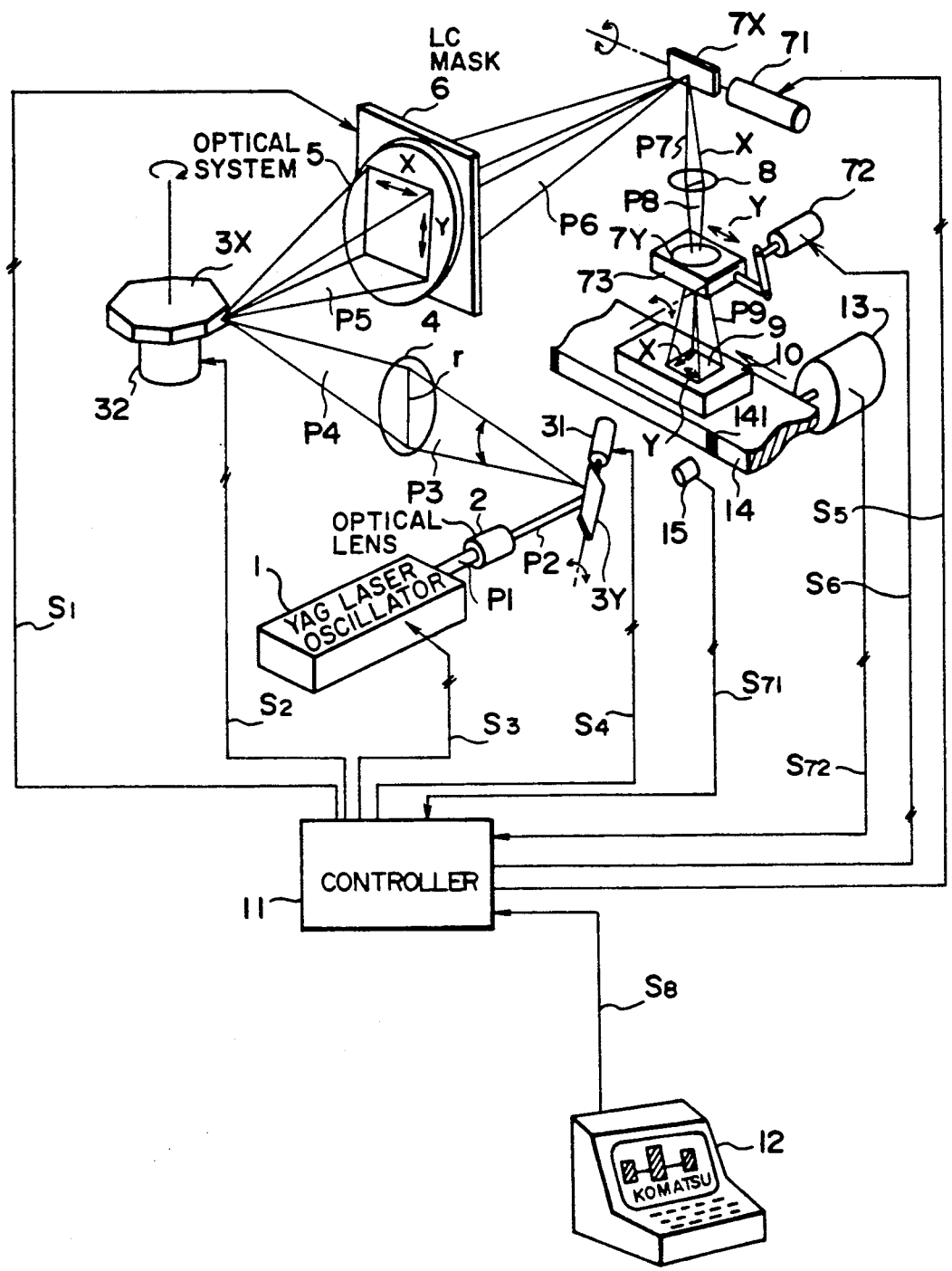
FIG. 1 schematically illustrates a first embodiment of a YAG laser mask marker according to the first aspect of the present invention.

FIG. 1 illustrates a first embodiment of a YAG laser mask marker according to the first aspect of the present invention. The YAG laser mask marker includes a YAG laser oscillator 1 provided with a Q switch, an optical lens 2 for providing a condensed laser beam P2 from the laser beam P1 emitted by the YAG laser oscillator 1, a first deflector comprising a first X direction deflector 3X and a first Y direction deflector 3Y for deflecting the laser beam P2 in X and Y directions for raster scanning, an optical system 4 for converting the laser beam P3 reflected by the first Y direction deflector 3Y into a converging beam P4 directed to a single spot on a deflecting surface of the first X direction deflector 3X, a liquid crystal mask 6 for displaying a pattern which electrically transmits or scatters a raster scanned light beam P5 from the first deflector 3X and 3Y, a second deflector comprising a second X direction deflector 7X and a second Y direction deflector 7Y for further deflecting in X and Y directions the raster scanned light P6 which has passed through the liquid crystal mask 6, an optical system 5 for changing the direction of the laser beam P6 such that the raster scanned light P5 reaches a single spot on the reflected surface of the second X direction deflector 7X, a work 10 on which a raster scanned light P9 from the second deflector 7X and 7Y is illuminated to print the pattern, and a controller 11. The YAG laser mask marker will be described in detail below.

The first deflector 3X and 3Y includes a polygonal mirror 3X serving as the X direction deflector and a galvanometer scanner 3Y serving as the Y direction deflector which are provided separately from each other in such a manner that a rotary shaft of one and a pivot shaft of the other are perpendicular to each other. In this embodiment, the polygonal mirror 3X has 36 surfaces. The rotation of the polygonal mirror 3X can be performed in several fixed speed rotation modes. In the present preferred embodiment, the fixed speed rotation modes are 60, 120 and 200 rpm. The polygonal mirror 3X is rotated at an optimum mode selected for each type of work. That is, a single surface of the polygonal mirror 3X corresponds to a single line on the liquid crystal mask in the X direction, and a single rotation of the polygonal mirror 3X corresponds to 36 lines in the X direction.

The galvanometer scanner 3Y rotates incrementally by a single fine deflection angle while the light receiving spot of the laser beam P4 is varied from one surface to a subsequent surface of the polygonal mirror 3X by the rotation thereof, and then stops. The time it takes for the galvanometer scanner 3Y to make a rotation by a single fine angle is about 3 ms. In the presently preferred embodiment, the galvanometer scanner 3Y is operated at 43 fine deflection angles or stages. After the galvanometer scanner 3Y is operated at the final or 43rd deflection angle, it is reversely rotated and thereby returned to the first deflection angle. The neutral position may be set to the 22nd stage or deflection angle. However, in the presently preferred embodiment, the neutral position is set to the raster scanning starting position, i.e., the first stage. That is, a single fine deflection angle of the galvanometer scanner 3Y corresponds to a line feed in the Y direction of the liquid crystal mask 6. The galvanometer scanner 3Y is rotated by a single fine deflection angle each time a single surface of the polygonal mirror 3X is completed, and stays there until that single surface of the polygonal mirror 3X is completed.

The liquid crystal mask 6 is a transmission dispersion type liquid crystal mask. A large number of parallel electrode lines are provided on the front and rear surfaces of the liquid crystal in such a manner that the electrode lines provided on the front surface cross the electrode lines provided on the rear surface. In this liquid crystal mask, the liquid crystal in the portion where no voltage is applied to crossed electrode lines scatters the laser beam, while the liquid crystal in the portion where a voltage is applied to crossed electrode lines transmits the laser beam. Such an electrical characteristic is utilized to form a desired pattern instantaneously by selective application of a voltage to the electrodes. Unlike conventional liquid crystal masks, this liquid crystal mask does not require a polarizing plate. Thus, the intensity of the laser beam which has passed through the liquid crystal mask 6 is twice as large as that of a laser beam which has passed through a conventional liquid crystal mask. In the presently preferred embodiment, a divided pattern portion is displayed on the liquid crystal mask in a dot matrix consisting of 24×24 dots. Display of a divided pattern portion on the liquid crystal mask 6 can also be conducted in a 72×36 dot matrix or other dot matrixes.

The second deflector includes a galvanometer scanner 7X serving as the second X direction deflector, and a lens system 7Y serving as the second Y direction deflector which are provided separately from each other in such a manner that a rotary shaft of one and a parallel shifting shaft of the other are perpendicular to each other. The second deflector 7X and 7Y stays at a position where it is directed to the area where the divided pattern portion is to be printed until the raster scanning of the divided pattern portion on the liquid crystal mask 6 is completed. As the divided pattern portion on the liquid crystal mask 6 is changed to a subsequent divided pattern portion, the second deflector 7X and 7Y is driven such that it is directed to the area where the new divided pattern portion is to be printed. After the second deflector 7X and 7Y has been driven to the new position, it stays there until the raster scanning of the new divided pattern portion on the liquid crystal mask 6 is completed.

The second deflector 7X and 7Y shown in FIG. 1, constituting an embodiment provided according to the ninth aspect of the present invention, will be described below. The raster scanned light P6 which has passed through the liquid crystal mask 6 passes through the X direction deflecting galvanometer scanner 7X, an objective lens 8, the Y direction deflecting lens 7Y, and then reaches the work 10 to print the pattern of the liquid crystal mask 6 on a surface 9 of the work 10. The Y direction deflecting lens 7Y is fixed to a mechanism 72 and 73 for movement of the lens 7Y parallel to the surface of the work 10 which is to be printed. An AC motor 72 is driven at a timing designed by the controller 11. The table 73 on which the lens 7Y is fixed is moved back and forth parallel to the printing surface of the work 10 by the AC motor 72 via a link mechanism coupled to an output shaft of the motor 72.

A second deflector is known that consists of two galvanometer scanners 7X and 7Y whose pivot shafts are perpendicular to each other and which are provided separately from each other. Also, a second deflector is known which consists of a galvanometer scanner 7X and an oscillating lens 7Y also serving as the objective lens. In this second deflector, a pivot shaft and an oscillating shaft are perpendicular to each other and are provided separately from each other.

In the former type of second deflector, since the two galvanometer scanners 7X and 7Y are deflected twice, distortion of the formed images is great. To correct such a distortion, a lens must be provided between the galvanometer scanners 7X and 7Y in addition to the normal objective lens provided between the galvanometer scanner 7Y and work 10, and this makes the lens system large.

In the latter type of second deflector, reduction in the focal length of, for example, the oscillating lens 7Y increases variations of aberration, thus shifting the printing position or reducing the density of the illuminated laser beam intensity.

The second deflector shown in FIG. 1 is an improved one of the latter type. However, unlike the latter type in which the Y direction deflector also serves as the objective lens, the independent objective lens 8 is provided, and the mechanism 72 and 73 for moving the Y direction deflecting lens 7Y along a line parallel to the printing surface of the work 10 is provided in place of the oscillating mechanism. Consequently, the size of the lens system is not increased, and the shift of the printing position and the reduction in the density of the laser beam intensity can be eliminated.

Description of the first embodiment will continue. The YAG laser oscillator body 1 is of the type which pulse oscillates CW oscillation by the Q switch. The Q switch is the one which utilizes the acoustic optical effect (A/O). The Q switch is also used to reduce intensity of the laser beam. At that time, the lower the intensity, the better. However, practically, the intensity of laser beam illuminated is determined with the laser oscillation ability of the YAG laser oscillator 1, the heat load resistance of the glass system, the material of the work 10, the rotational speed of the polygonal mirror 3X, and other conditions taken into consideration. For example, a laser beam intensity set to a value less than the threshold determined by each of the works has flexibility. The threshold is the intensity of laser beam which is determined by the material of the work and which assures printing on the work. In the entire pattern, one portion thereof can be printed deeper or shallower than another portion during raster scanning by setting the intensity of laser beam to a value equal to or greater than the threshold using the Q switch.

The condenser optical system is provided in the laser beam incident path to each of the first and second deflectors. The condenser optical system condenses a laser beam which is to be incident on each of the deflectors and which has a large diameter or a deflection angle, and thereby reduces deformation or variations of printing or laser loss. The laser beam is illuminated on the deflector in the form of a fine spot by the condenser optical system. Consequently, a small deflector can be employed, and the drive inertia of the deflector can thus be reduced. This makes high speed control free from variations and fine control of the deflector by the controller possible.

The condenser optical system for the first deflector includes a relay lens 2 provided between the YAG laser oscillator 1 and the galvanometer scanner 3Y, and a relay lens 4 provided between the galvanometer scanner 3Y and the polygonal mirror 3X. The relay lens 2 is disposed to prevent the angle of incidence of the laser beam P1 from the laser oscillator 1 having a large beam diameter on the galvanometer scanner 3Y differing from the reflection angle thereof by the deflection angle of the galvanometer scanner 3Y. In this embodiment, the diameter of the laser beam P1 is 2 mm, and the liquid crystal mask having dimensions of 70 mm×70 mm (the dot matrix consists of 24×24 dots) is scanned in the Y direction over 43 lines. Hence, another reason for the provision of the relay lens 2 is to condense the laser beam P1 to a diameter which ensures that the laser beam P1 can be overlaid on top of another by approximately 30%. Due to the provision of the relay lens 4, the provision of a very large polygonal mirror 3X capable of receiving the laser beam P3 of all the deflection angles of the galvanometer scanner 3Y is unnecessary. That is, the size and weight of the polygonal mirror 3X can be reduced. In this invention, the laser beam P4 is condensed by the relay lens 4 so that it can be illuminated on a single spot on each of the surfaces of the polygonal mirror 3X. Thus, the raster scanning laser beam P5 from the polygonal mirror 3X to the liquid crystal mask 6 can be made uniform, and the number of surfaces of the polygonal mirror 3X can be increased. Consequently, the rotational speed of the polygonal mirror 3X can be reduced, and control of the first deflector by the controller 11 is thus made easier.

The condenser optical system for the second deflector includes a relay lens 5 which is disposed close to the liquid crystal mask 6 between the polygonal mirror 3X of the first deflector and the galvanometer scanner 7X of the second deflector. The relay lens 5 is disposed to make the raster scanning light P5 from the polygonal mirror 3X first parallel rays of light and then a refracted beam P6 converging on the galvanometer scanner 7x of the second deflector.

The controller 11 is connected to the liquid crystal mask 6 by means of an electric wire S1 to a driving portion 32 of the polygonal mirror 3X by means of an electric wire S2, to the Q switch of the YAG laser 1 by means of an electric wire S3, to a driving portion 31 of the galvanometer scanner 3Y by means of an electric wire S4, to a driving portion 71 of the galvanometer scanner 7X by means of an electric wire S5 and to a driving portion 72 of the lens system 7Y by means of an electric wire S6.

Figure 4:
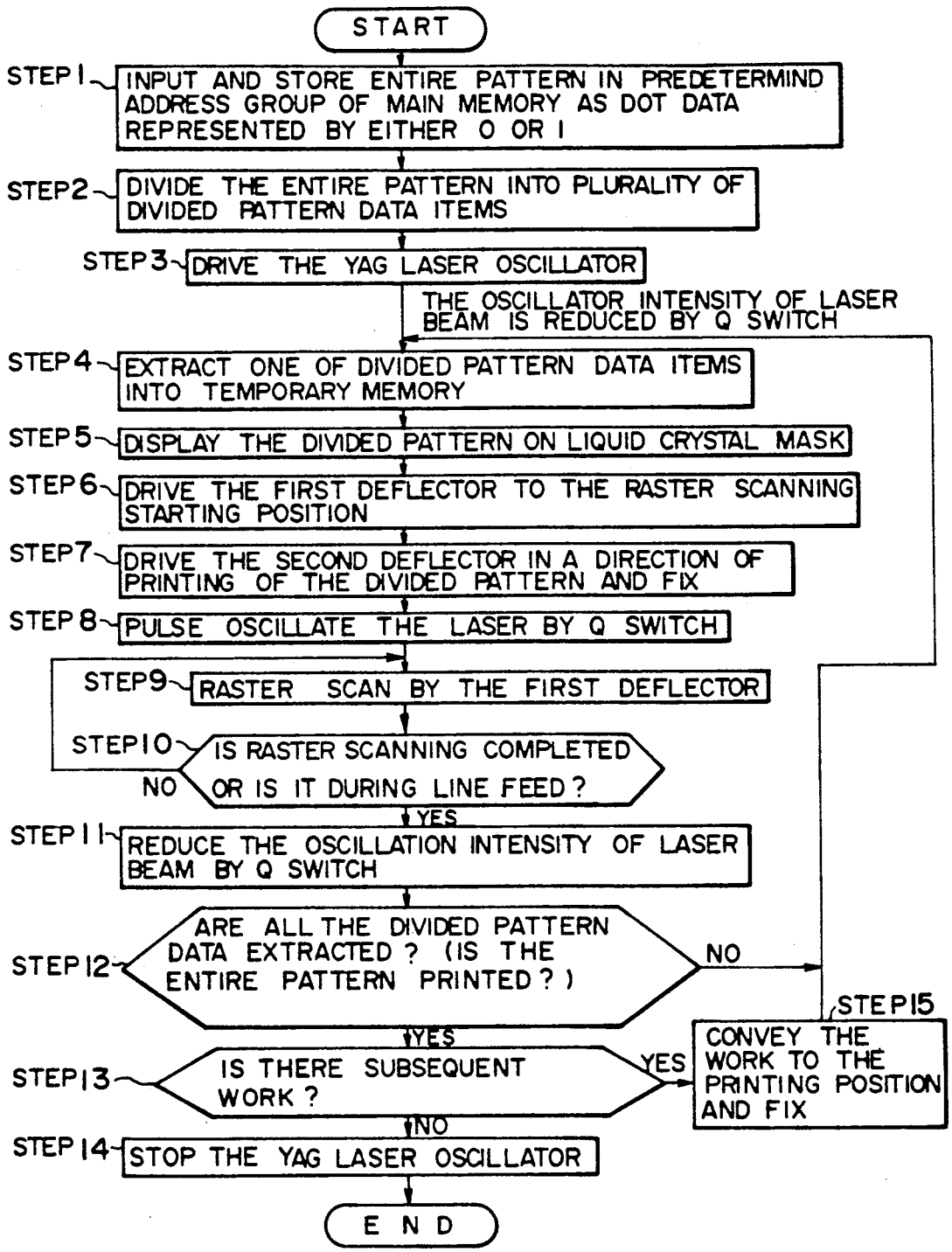
FIG. 4 is a flowchart of a control operation of the YAG laser mask marker according to the first aspect of the present invention.

The control by the controller 11 will be described below with reference to the flowchart of FIG. 4.

First, an entire pattern to be printed on the work is stored in a predetermined address group of the main memory in the controller as dot data wherein each dot is 0 or 1 (step 1). Next, the stored entire pattern is divided into a plurality of divided pattern portion data items consisting of a plurality of address groups (step 2). Thereafter, the YAG laser oscillator is driven. At that time, the intensity of the laser beam oscillated by the YAG laser oscillator is reduced by the Q switch (step 3). Next, a single divided pattern portion data item is extracted from the main memory to a temporary memory in the controller (step 4). Next, the single divided pattern portion is displayed on the liquid crystal mask 6 on the basis of the extracted divided pattern data item (step 5). Next, the first deflector is driven to the raster scanning starting position, and is then stopped (step 6). Next, the second deflector is driven such that it is directed toward the printed area on the work according to the address data of the divided pattern portion data item, and is then stopped (step 7). Next, the laser beam is pulse oscillated by the Q switch (step 8), and the liquid crystal mask 6 is raster scanned by the first deflector (step 9) until the raster scanning of the divided pattern portion is completed (step 10). After the raster scanning is completed, the intensity of laser beam is reduced by the Q switch (step 11). The process consisting of steps 4 through 11 is repeated until extraction of all the divided pattern portion data is completed, i.e., until synthetic printing of the entire pattern on the work is completed (step 12). Next, if there is no subsequent work (step 13), the oscillation of the YAG laser oscillator is stopped (step 14). If there is a subsequent work (step 13), the subsequent work is conveyed to the printing position and stability thereof is awaited (step 15). If the subsequent printing is the same as the previous one, the process returns to step 4, and the divided pattern data item representing the predetermined first address is extracted. Thereafter, the same process as the aforementioned one is repeated to complete synthetic printing of the predetermined entire pattern on the new work. If a subsequent printing is different from the previous one, a new entire pattern is stored in the main memory in the controller as dot data (step 1), and then the aforementioned process is repeated.

Figure 5:
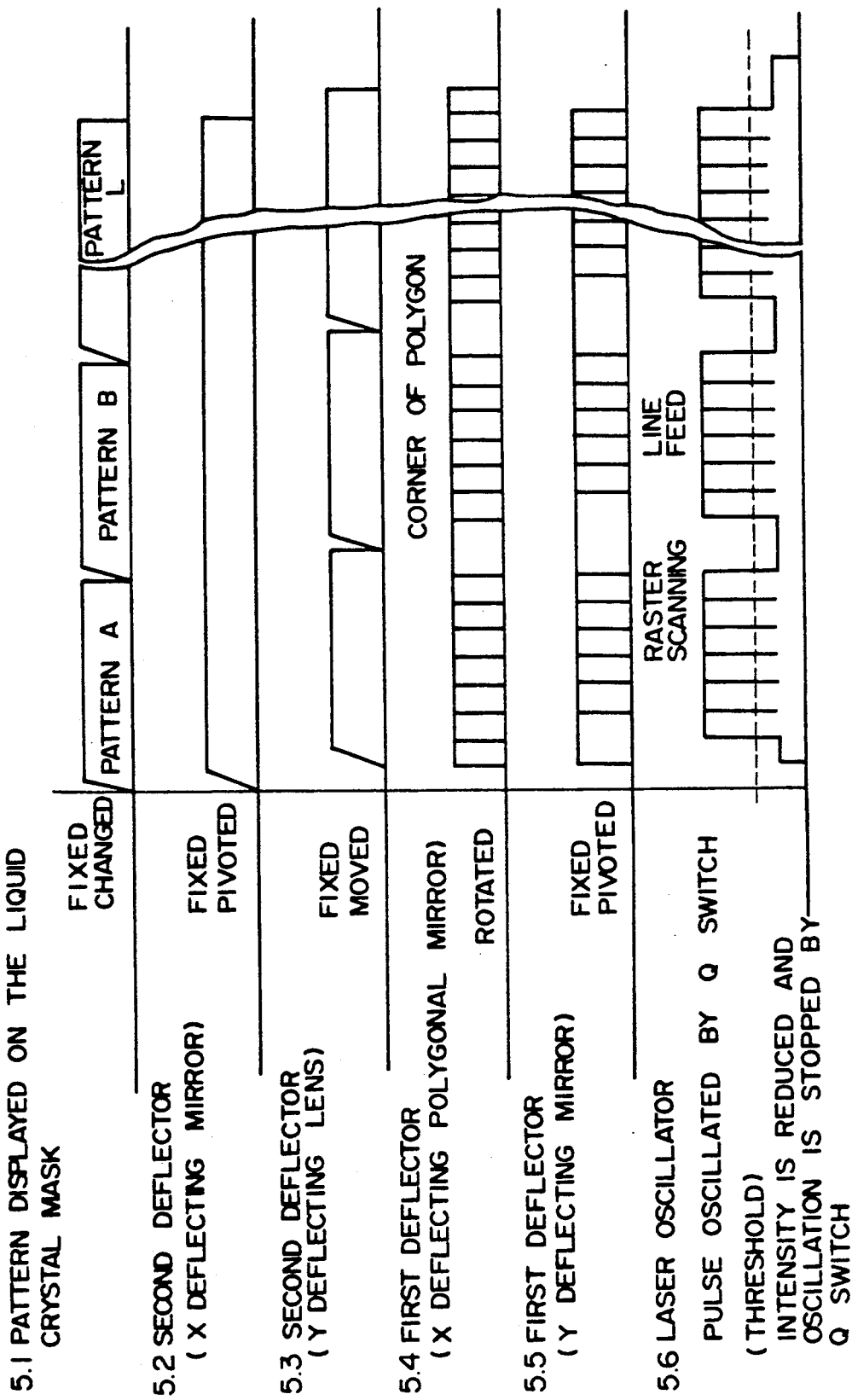
FIG. 5 is a timing chart of a control operation of the YAG laser mask marker according to the first aspect of the present invention.
Figure 6:
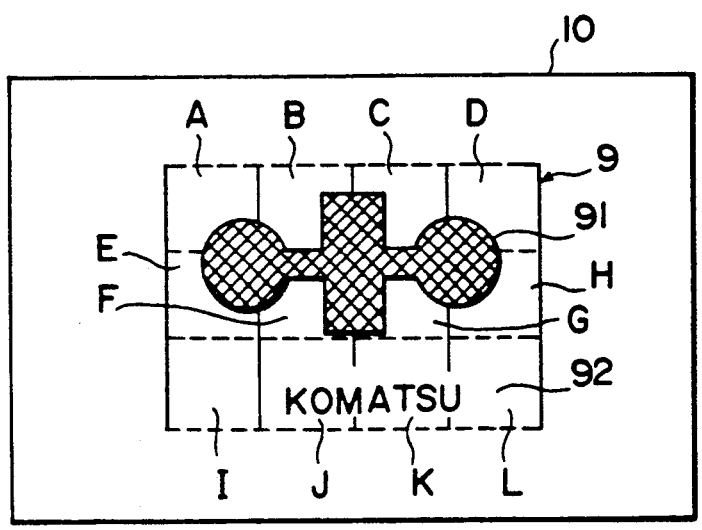
FIG. 6 illustrates an entire pattern and the divided pattern portions thereof according to the present invention.

FIG. 5 is a timing chart of the control by the controller 11. This timing chart is one in which an entire pattern 9, consisting of a FIG. 91 and alphabetic characters 92, as illustrated in FIG. 6, is stored in the main memory of the controller 11 at 96 dots (width)×72 dots (height) as the printing data consisting of 1 representing a printing portion and 0 representing a non-printing portion. This entire pattern 9 is divided into 12 divided pattern data items A through L of 4 (width)×3 (height).

Regarding the aforementioned entire pattern data and divided pattern data items, display of the patterns on the liquid crystal mask is indicated by 5.1 in FIG. 5, the X and Y deflection timings of the second deflector are indicated by 5.2 and 5.3, the X and Y deflection times of the first deflector are indicated by 5.4 and 5.5, and the drive or stoppage of the laser oscillator and the driving timing of the Q switch are indicated by 5.6. The control timing shown in FIG. 5 is characterized in that either of the X direction deflector or the Y direction deflector of the second deflector is driven first, and in that the remaining deflector is driven after the drive of the first deflector is completed. This sequential drive enables loss of the driving time of the second deflector to be reduced (see 5.2 and 5.3). Other description will be omitted.

The controller 11 is connected to a drive motor 13, of a table 14 on which many works 10 are orderly provided, by means of an electric wire S72, and to a position sensor 15, for detecting that the stoppage of the work 10 at a predetermined printing position from the rotation and stoppage of the motor 13, by means of an electric wire S71. The controller 11 also controls the operation of these components to perform synthetic printing of the same entire pattern on the surface of each of the works 10.

Other embodiments according to the first aspect of the present invention will be described below. (1) The relay lens 2 used in the first embodiment may be omitted. (2) The first deflector may consist of two galvanometer scanners for deflection in the X and Y directions. In that case, one of the galvanometer scanners must be rotated at a fixed speed, like the polygonal mirror 3X of the first embodiment. (3) The layout of the polygonal mirror 3X and the galvanometer scanner 3Y of the first deflector, employed in the first embodiment, may be reversed. (4) The first deflector may comprise a combination of the polygonal mirror 3X, the galvanometer scanner 3Y, and a lens, cylindrical lens or prism that can be oscillated. (5) The relay lens 8, which is disposed on the light incident side of the liquid crystal mask 6 in the first embodiment, may be disposed on a light emerging side or on both sides of the liquid crystal mask 6. If the relay lens is disposed on both sides of the liquid crystal mask 6, the light which has passed through the liquid crystal mask 6 is not a deflected light but parallel rays of light. However, the number of lens system increases accordingly. (6) The second deflector may consist of two galvanometer scanners for deflection in the X and Y directions. Alternatively, the objective lens of the second deflector may be replaced by an oscillating lens, a cylindrical lens, or a prism.

The embodiment according to the first aspect of the present invention has the following advantages.

The YAG laser has an advantage in that the heat load thereof to the optical system is less. Unlike the conventional technique in which the enlarged laser beam is batch illuminated, raster scanning by the first deflector 3X and 3Y is pinpoint illumination of the laser beam. Thus, the laser beam can be illuminated to the liquid crystal mask 6 uniformly at a high intensity. Furthermore, the provision of the Q switch increases the peak value of the intensity of laser beam illuminated during raster scanning. Also, since the liquid crystal mask 6 does not require a polarizing plate, the intensity of laser beam which has passed through the liquid crystal mask 6 is twice that obtainable with a polarizing plate. Consequently, a small YAG laser oscillator 1 can be used, and deep and hence sharp printing can be performed. The second deflector 7X and 7Y makes synthetic printing of the entire pattern over a large area possible without moving the work 10. Since the condenser optical system condenses a large diameter and deflected laser beam incident on the deflector, deformation and variations of printing and laser loss can be alleviated, and the use of a small deflector is made possible. As a result, the drive inertia of the deflector can be reduced, and high speed control and fine control of the deflector are made possible. The controller 11 optimumly controls the drives of the first deflector 3X and 3Y, the change of the display on the liquid crystal mask 6, the drives of the second deflector 7X and 7X and the drive of the Q switch during printing. In particular, the control of the Q switch enables the oscillation intensity of the laser beam to be reduced when it is not necessary for printing, eliminating distortion and scattering of the laser beam and eliminating an increase in the heat load to the glass system. Consequently, effective synthetic printing on a metal or ceramic is made possible. Also, the damage to the YAG laser mask marker by the high intensity laser beam can be eliminated.

In an embodiment according to the second aspect of the present invention, the control process of step 6 in the first embodiment is executed after step 7, between steps 3 and 4 (including between steps 10 and 11, steps 11 and 12 and steps 12 and 4), between the steps 4 and 5 or between steps 8 and 9. That is, the process of step 6 can be conducted any time before the printing is initiated and during printing except for the time of raster scanning (steps 9 and 10).

In an embodiment according to the third aspect of the present invention, "when none of the dots of the extracted divided pattern data item has any printing data" corresponds to the divided pattern portion I in FIG. 6. That is, when the divided pattern portion I, in which no printing data exists over the entire surface, is displayed on the liquid crystal mask 6, no voltage is applied between any of the electrode pairs. Thus, the controller 11 sends an instruction to the liquid crystal mask 6 on the basis of such printing data to omit display of the divided pattern portion. This determination is made in step 4 of FIG. 4. At that time, the operator who visually checks the entire pattern or the individual divided patterns may determine whether or not there is a divided pattern portion in which no printing data exists and designate that divided pattern portion by key input.

In this embodiment, since the controller 11 sends an instruction to the liquid crystal mask 6 to omit display of the divided pattern portion in which no printing data exists over the entire surface, the generation of scattered laser beam, an increase in the heat load to the glass system, and the drive loss of the deflector can be eliminated while the high speed printing is assured.

In an embodiment according to the fourth aspect of the present invention, "when none of the dots of at least a single line corresponding to the uppermost, lowermost, rightmost or leftmost side of the extracted divided pattern data item has any printing data" corresponds to the divided pattern portions A through E, and H through L shown in FIG. 6. When a divided pattern portion is displayed on the liquid crystal mask in which at least one raster scanned line corresponding to the uppermost, lowermost, rightmost or leftmost side is in a laser beam scattered state, i.e., a line in which no printing data exists, no voltage is applied between the electrode pairs on that line in which no printing data exists. Thus, the controller 11 sends an instruction to the first deflector 3X and 3Y on the basis of such data to omit the raster scanning of the line in which no printing data exists.

In the above mentioned embodiment, since the controller 11 sends an instruction to the first deflector 3X and 3Y to omit raster scanning of the line in the divided pattern portion in which no printing data exists and thereby omit laser beam illumination, the generation of scattered laser beam, an increase in the heat load to the glass system, and the drive loss of the deflector can be eliminated while the high speed printing is assured.

In an embodiment according to the fifth aspect of the present invention, although the raster scanning of the liquid crystal mask 6 by the first deflector 3X and 3Y is conducted over the entire surface of the liquid crystal mask 6 in the manner described above, when the laser beam is illuminated on the line in which no printing data exists, the intensity of laser beam is reduced by operating the Q switch for 0.5 ms.

In this embodiment, although the controller 11 performs raster scanning of the entire surface, the intensity of the laser beam is reduced by the Q switch while the line in which no printing data exists is raster scanned. Thus, the generation of a large amount of scattered laser beam and an increase in the heat load to the glass system can be eliminated.

In the entire pattern which has been printed, a gap may be present between the adjacent printed portions of the adjacent divided pattern portions due to backlash of the second deflector, variations in the position of the optical system element or variations in the control signal caused by the external noises. In an embodiment according to the sixth aspect of the present invention, revised divided pattern data items in which the adjoining areas are overlapped on top of one another by at least one line is provided. Activation or cancellation of this embodiment may be manually inputted by the operator.

In this embodiment, since the controller 11 divides the adjacent divided pattern portions such that the adjacent areas are slightly overlapped on top of one another, the generation of a printing gap which deteriorates the external view of the printed pattern can be eliminated, thus providing clear printing.

In an embodiment according to the seventh aspect of the present invention, the entire pattern is displayed on the liquid crystal mask 6 without being divided, and only the entire pattern printing position changing instruction is given to the second deflector 7X and 7Y. Activation or cancellation of this embodiment may be manually inputted by the operator.

In this embodiment, the controller 11 displays the entire pattern which is not divided on the liquid crystal mask 6. This embodiment is suitable for printing a simple and small entire pattern on a fine area of the work.

In an embodiment according to the eighth aspect of the present invention, the intensity of laser beam oscillated is reduced by the Q switch while the line feed is conducted during raster scanning. This control for the line feed is represented by the process of steps 10, 11 in the flowchart of FIG. 4.

In this embodiment, problems involving illumination of the laser beam, such as distortion and reflection of the laser beam and an increase in the heat load to the glass system, can be eliminated.

The optional function of this embodiment is connected to the electric wire S8 which extends from the external terminal 12 shown in FIG. 1. However, the input device thereof may be incorporated in the controller 11.

In an embodiment according to the ninth aspect of the present invention, it is not necessary to add a lens to the second deflector 7X and 7Y of the YAG laser mask marker. Furthermore, aberration can be reduced to a minimum value, and adequate printing can be conducted. Thus, deep and sharp printing can be performed over a wide printing area.

In brief, the present invention has the following advantages.

According to the first or second aspect of the present invention, a complicated pattern can be adequately and freely changed. Furthermore, clear, high speed synthetic printing can be performed over a large area at a low laser output without generating variations and without moving the work during printing.

According to the third aspect of the present invention, the generation of a large amount of scattered layer beam, an increase in the heat load to the glass system, and the drive loss of the deflector can be eliminated while high speed printing can be ensured.

According to the fourth aspect of the present invention, the generation of a large amount of scattered laser beam, an increase in the heat load to the glass system, and the drive loss of the deflector can be eliminated while high speed printing can be ensured.

According to the fifth aspect of the present invention, the generation of a large amount of scattered laser beam and an increase in the heat load to the glass system can be eliminated.

According to the sixth aspect of the present invention, the generation of a bad looking printing gap can be eliminated while sharp printing can be performed.

According to the seventh aspect of the present invention, a fine and simple entire pattern can be adequately printed in a fine area on the work.

According to the eighth aspect of the present invention, the distortion and reflection of the laser beam and an increase in the heat load to the glass system can be eliminated.

According to the ninth aspect of the present invention, aberration can be minimized and adequate printing can be performed without incorporating an additional lens. Consequently, deep printing can be performed over a large entire printing area, and sharp printing can be performed.

INDUSTRIAL APPLICABILITY

The YAG laser mask marker according to the present invention can adequately and instantaneously change a pattern, including complicated and desired characters, symbols, figures and patterns, formed on a work made of a metal, resin, ceramic, paper or cloth, and can perform clear, high speed printing over a large area without moving the work during printing and without generating variations using a small laser oscillator.

What is claimed is:

1. A laser mask marker for marking a pattern on a surface of a work, said mask marker comprising:
    a laser oscillator having a Q switch;
    a first deflector for deflecting in X and Y directions a laser beam from said laser oscillator;
    a liquid crystal mask for displaying a predetermined pattern to be raster scanned by the laser beam from said first deflector and for transmitting the resulting raster scanned laser beam through said liquid crystal mask responsive to the thus scanned pattern;
    a second deflector for deflecting in X and Y directions the thus transmitted raster scanned laser beam onto the work; and
    a controller which stores pattern data representing a pattern to be marked on the work, and controls the marking of the work by displaying on said liquid crystal mask at least a portion of the stored pattern data.

2. A laser mask marker in accordance with claim 1 wherein said controller stores entire pattern data in the form of dot data representing an entire pattern to be marked on the work, divides the stored entire pattern data into a plurality of block-shaped divided pattern data items, and controls the marking of the work by displaying a block-shaped divided pattern data item on said liquid crystal mask.

3. A laser mask marker in accordance with claim 2 wherein when none of the dots of a block-shaped divided pattern data item selected from the stored entire pattern data has any data representing marking to be accomplished, said controller omits the display of the selected block-shaped divided pattern data item by said liquid crystal mask, and selects a subsequent block-shaped divided pattern data item from the stored entire pattern data.

4. A laser mask marker in accordance with claim 3, wherein when none of the dots of at least one line corresponding to the uppermost, lowermost, rightmost or leftmost side of a selected block-shaped divided pattern data item has any data representing marking to be accomplished, said controller causes said first deflector to omit the raster scanning of said at least one line in which none of the dots has any data representing marking to be accomplished.

5. A laser mask marker in accordance with claim 4, wherein said controller divides the stored entire pattern data into a plurality of block-shaped divided pattern data items such that the dot data corresponding to the adjoining sides of the adjoining block-shaped divided pattern data items are overlapped on top of one another by at least one line.

6. A laser mask marker in accordance with claim 5, wherein said controller uses said Q switch to lower the intensity of the laser beam emitted by said laser oscillator while a line feed is conducted during raster scanning.

7. A laser mask marker in accordance with claim 5, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

8. A laser mask marker in accordance with claim 4, wherein said controller uses said Q switch to lower the intensity of the laser beam emitted by said laser oscillator while a line feed is conducted during raster scanning.

9. A laser mask marker in accordance with claim 4, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

10. A laser mask marker in accordance with claim 3, wherein when none of the dots of at least one line corresponding to the uppermost, lowermost, rightmost or leftmost side of a selected divided pattern data item has any data representing marking to be accomplished, said controller causes said Q switch to lower the intensity of laser beam oscillated to said at least one line in which none of the dots has any data representing marking to be accomplished.

11. A laser mask marker in accordance with claim 10, wherein said controller divides the stored entire pattern data into a plurality of block-shaped divided pattern data items such that the dot data corresponding to the adjoining sides of the adjoining block-shaped divided pattern data items are overlapped on top of one another by at least one line.

12. A laser mask marker in accordance with claim 11, wherein said controller uses said Q switch to lower the intensity of the laser beam emitted by said laser oscillator while a line feed is conducted during raster scanning.

13. A laser mask marker in accordance with claim 11, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

14. A laser mask marker in accordance with claim 10, wherein said controller uses said Q switch to lower the intensity of the laser beam emitted by said laser oscillator while a line feed is conducted during raster scanning.

15. A laser mask marker in accordance with claim 10, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

16. A laser mask marker in accordance with claim 3, wherein said controller divides the stored entire pattern data into a plurality of block-shaped divided pattern data items such that the dot data corresponding to the adjoining sides of the adjoining block-shaped divided pattern data items are overlapped on top of one another by at least one line.

17. A laser mask marker in accordance with claim 16, wherein said controller uses said Q switch to lower the intensity of the laser beam emitted by said laser oscillator while a line feed is conducted during raster scanning.

18. A laser mask marker in accordance with claim 16, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

19. A laser mask marker in accordance with claim 3, wherein said controller uses said Q switch to lower the intensity of the laser beam emitted by said laser oscillator while a line feed is conducted during raster scanning.

20. A laser mask marker in accordance with claim 3, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

21. A laser mask marker in accordance with claim 2, wherein when none of the dots of at least one line corresponding to the uppermost, lowermost, rightmost or leftmost side of a selected block-shaped divided pattern data item has any data representing marking to be accomplished, said controller causes said first deflector to omit the raster scanning of said at least one line in which none of the dots has any data representing marking to be accomplished.

22. A laser mask marker in accordance with claim 21, wherein said controller divides the stored entire pattern data into a plurality of block-shaped divided pattern data items such that the dot data corresponding to the adjoining sides of the adjoining block-shaped divided pattern data items are overlapped on top of one another by at least one line.

23. A laser mask marker in accordance with claim 22, wherein said controller uses said Q switch to lower the intensity of the laser beam emitted by said laser oscillator while a line feed is conducted during raster scanning.

24. A laser mask marker in accordance with claim 22, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

25. A laser mask marker in accordance with claim 21, wherein said controller uses said Q switch to lower the intensity of the laser beam emitted by said laser oscillator while a line feed is conducted during raster scanning.

26. A laser mask marker in accordance with claim 21, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

27. A laser mask marker in accordance with claim 2, wherein when none of the dots of at least one line corresponding to the uppermost, lowermost, rightmost or leftmost side of a selected divided pattern data item has any data representing marking to be accomplished, said controller causes said Q switch to lower the intensity of laser beam oscillated to said at least one line in which none of the dots has any data representing marking to be accomplished.

28. A laser mask marker in accordance with claim 27, wherein said controller divides the stored entire pattern data into a plurality of block-shaped divided pattern data items such that the dot data corresponding to the adjoining sides of the adjoining block-shaped divided pattern data items are overlapped on top of one another by at least one line.

29. A laser mask marker in accordance with claim 28, wherein said controller uses said Q switch to lower the intensity of the laser beam emitted by said laser oscillator while a line feed is conducted during raster scanning.

30. A laser mask marker in accordance with claim 28, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

31. A laser mask marker in accordance with claim 27, wherein said controller uses said Q switch to lower the intensity of the laser beam emitted by said laser oscillator while a line feed is conducted during raster scanning.

32. A laser mask marker in accordance with claim 27, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

33. A laser mask marker in accordance with claim 2, wherein said controller divides the stored entire pattern data into a plurality of block-shaped divided pattern data items such that the dot data corresponding to the adjoining sides of the adjoining block-shaped divided pattern data items are overlapped on top of one another by at least one line.

34. A laser mask marker in accordance with claim 33, wherein said controller uses said Q switch to lower the intensity of the laser beam emitted by said laser oscillator while a line feed is conducted during raster scanning.

35. A laser mask marker in accordance with claim 33, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

36. A laser mask marker in accordance with claim 2, wherein said controller uses said Q switch to lower the intensity of the laser beam emitted by said laser oscillator while a line feed is conducted during raster scanning.

37. A laser mask marker in accordance with claim 2, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

38. A laser mask marker in accordance with claim 2 wherein said controller controls the marking of the work by:
(a) using said Q switch to lower the intensity of the laser beam emitted by said laser oscillator,
(b) selecting one block-shaped divided pattern data item from the plurality of block-shaped divided pattern data items together with address data thereof,
(c) displaying the thus selected block-shaped divided pattern data item on said liquid crystal mask as a divided pattern portion,
(d) driving said first deflector to a raster starting position and stopping said first deflector at that position,
(e) driving said second deflector on the basis of the address data on said thus selected block-shaped divided pattern data item such that said second deflector is directed toward an area on the work to be marked and stopping said second deflector there,
(f) pulse oscillating said laser oscillator by said Q switch and thereby raster scanning the divided pattern portion displayed on said liquid crystal mask by said first deflector, and
(g) performing step (a) through step (f) on other block-shaped divided pattern data items until the entire pattern is synthesized on the work.

39. A laser mask marker in accordance with claim 38, wherein the step (d) is conducted prior to the step (a), between the steps (a) and (b), between the steps (b) and (c) or between the steps (e) and (f).

40. A laser mask marker in accordance with claim 1, wherein said controller uses said Q switch to lower the intensity of the laser beam emitted by said laser oscillator while a line feed is conducted during raster scanning.

41. A laser mask marker in accordance with claim 1, wherein said second deflector includes a galvanometer scanner disposed close to said liquid crystal mask for deflecting in the X direction the laser beam transmitted by said liquid crystal mask, a Y direction deflection lens disposed close to the work for deflecting in the Y direction the laser beam deflected by said galvanometer scanner, and an objective lens disposed between said galvanometer scanner and said Y direction deflection lens, said Y direction deflection lens being provided on a mechanism for moving said Y direction deflection lens parallel to a surface of the work.

42. A laser mask marker in accordance with claim 1 wherein said controller simultaneously displays all of the stored pattern data on said liquid crystal mask.

43. A laser mask marker in accordance with claim 1 wherein said laser oscillator is a YAG laser oscillator.

44. A laser mask marker in accordance with claim 1, wherein when none of the dots of at least one line corresponding to the uppermost, lowermost, rightmost or leftmost side of a selected divided pattern data item has any data representing marking to be accomplished, said controller causes said Q switch to lower the intensity of laser beam oscillated to said at least one line in which none of the dots has any data representing marking to be accomplished.

* * * * *